United States Patent
Mayer et al.

(10) Patent No.: US 11,536,802 B2
(45) Date of Patent: Dec. 27, 2022

(54) RADAR SENSOR HEAD FOR A RADAR SYSTEM

(71) Applicant: Robert Bosch GmbH, Stuttgart (DE)

(72) Inventors: Marcel Mayer, Lonsee (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 337 days.

(21) Appl. No.: 16/959,134

(22) PCT Filed: Jan. 17, 2019

(86) PCT No.: PCT/EP2019/051133
§ 371 (c)(1),
(2) Date: Jun. 29, 2020

(87) PCT Pub. No.: WO2019/179669
PCT Pub. Date: Sep. 26, 2019

(65) Prior Publication Data
US 2020/0333435 A1   Oct. 22, 2020

(30) Foreign Application Priority Data
Mar. 22, 2018   (DE) .......................... 102018204377.9

(51) Int. Cl.
*G01S 7/40*   (2006.01)
*G01S 13/931*   (2020.01)

(52) U.S. Cl.
CPC .......... *G01S 7/4008* (2013.01); *G01S 7/4021* (2013.01); *G01S 13/931* (2013.01)

(58) Field of Classification Search
CPC .......... G01S 13/931; G01S 7/003; G01S 7/40; G01S 7/4008; G01S 7/4021
See application file for complete search history.

(56) References Cited

U.S. PATENT DOCUMENTS

| | | | |
|---|---|---|---|
| 6,121,919 A | 9/2000 | Ameen et al. | |
| 9,705,611 B1* | 7/2017 | West | H04B 5/0031 |
| 2014/0159954 A1 | 6/2014 | Stoddard | |

(Continued)

FOREIGN PATENT DOCUMENTS

| EP | 2881752 A1 | 6/2015 |
|---|---|---|
| EP | 3168637 A1 | 5/2017 |

(Continued)

OTHER PUBLICATIONS

International Search Report for PCT/EP2019/051133, dated Apr. 24, 2019.

(Continued)

*Primary Examiner* — Timothy X Pham
(74) *Attorney, Agent, or Firm* — Norton Rose Fulbright US LLP; Gerard Messina

(57) ABSTRACT

A radar sensor head for a radar system. The radar sensor head includes at least one transmitting antenna for generating and at least one receiving antenna for receiving radar waves; a preprocessing unit for defined preprocessing of received data; an interface for connecting the radar sensor head to a data line; and a calibration data unit for at least partially calibrating the transmitting antenna and/or the receiving antenna, calibration data for the transmitting antenna and the receiving antenna being stored using the calibration data unit.

10 Claims, 3 Drawing Sheets

(56) References Cited

U.S. PATENT DOCUMENTS

2015/0115978 A1    4/2015   Bories et al.
2016/0109559 A1*   4/2016   Delbecq ................ G01S 13/931
                                                                                      342/170

FOREIGN PATENT DOCUMENTS

JP        2003130945 A     5/2003
WO      2014178131 A1    11/2014

OTHER PUBLICATIONS

Schoor, Michael, et al., "High-Resolution Angle Estimation for Automobile FMCW Radar Sensor," University of Stuttgart, 2007, pp. 1-5.

Schoor, Michael. "Hochauflösende Winkelschätzung für automobile Radarsysteme [high-resolution angle estimation for automobile radar systems]," 2010. University Stuttgart, Stuttgart, Germany.

* cited by examiner

RADAR SENSOR HEAD FOR A RADAR SYSTEM

FIELD

The present invention relates to a radar sensor head for a radar system. The present invention furthermore relates to a radar system. The present invention furthermore relates to a method for manufacturing a radar sensor head for a radar system.

BACKGROUND INFORMATION

More and more radar sensors are being installed in vehicles having a high level of driver assistance functions or automated driving function. A higher performance in the case of automated or semi-automated functions is sought via a higher number of radar sensors rather than individual radar sensors. Previous approaches in this field include radar sensors which carry out extensive data processing of the received radar waves internally in the sensor. The radar sensors may thus supply data at the object or positioning level for a further evaluation by the vehicle. In this way, the quantity of data transmitted to the vehicle may be reduced, but the particular radar sensors have to have a higher processing power and a larger memory.

It is disadvantageous in this case that the processing power and the memory size are scalable comparatively unfavorably with respect to increased performance. This results in particular because starting from a defined requirement for the performance, the microcontroller technology is no longer sufficient for the required processing steps of the received radar waves. Therefore, to increase the performance, the required computations and analyses have to be carried out internally in the sensor within the scope of microprocessor technologies. This may have a disadvantageous effect on a price, a size, and on power losses of a radar sensor.

SUMMARY

An object of the present invention is to provide a radar sensor head for a radar system, which may be scaled cost-effectively and flexibly with regard to the number of the elements used.

This object may be achieved in accordance with example embodiment of the present invention. Advantageous designs of the present invention are described herein.

According to a first aspect of the present invention, the object is achieved by a radar sensor head for a radar system. An example radar system head according to the present invention includes:
- at least one transmitting antenna for generating and at least one receiving antenna for receiving radar waves;
- a preprocessing unit for defined preprocessing of received data;
- an interface for connecting the radar sensor head to a data line; and
- a calibration data unit for at least partially calibrating the transmitting antenna and/or the receiving antenna, calibration data for the transmitting antenna and the receiving antenna being storable with the aid of the calibration data unit.

In this way, a partitioning of the overall system is advantageously enabled by providing a radar sensor head. A calibration data unit may advantageously be implemented with low expenditure in the radar sensor head, with the aid of which at least a partial calibration of the radar sensor head may be carried out. In this way it is possible, for example, to carry out a replacement of the radar sensor head efficiently during a repair shop visit.

Contemporary radar sensors are frequently designed as fast chirp radar. This means that many fast FMCW (frequency-modulated continuous wave) ramps are transmitted into a scanning range, which is also referred to as a so-called chirp sequence or as a rapid chirp method. After the mixing of the received radar signals, the baseband signals are filtered, digitized, and generally supplied to a 2D Fourier transform. Since a subsequent Doppler FFT (Fast Fourier Transform) may only take place when the data or measuring signals of all ramps or frequencies have been processed, a large memory is necessary for buffering the received radar signals. In addition, due to the high latency requirement, there is a demand for a high processing power, due to which hardware accelerators are typically used.

When multiple radar sensors are used in a vehicle, it is advantageous in accordance with the present invention to concentrate the required processing power in at least one central control unit. The particular radar sensors may thus be designed as compact and cost-effective radar sensor heads without significant power losses. A better price-performance ratio may thus be achieved overall and a higher performance of the radar system may be implemented.

A provided radar sensor head includes components for generating and transmitting radar waves and components for receiving and processing received radar waves. The processing of the received radar waves is restricted in this case to the least possible amount and/or takes place with the least possible effort. In particular, the measuring data of the received radar waves may be digitized by the analog-to-digital converter and subsequently transmitted using a high bandwidth to the at least one central control unit. The further processing of the digitized measuring data from the at least one radar sensor head may subsequently take place in at least one central control device.

The costs for the particular radar sensor heads may be reduced in this way, since less processing power is necessary in the radar sensor heads. In addition, a lower power loss may occur in the particular radar sensor heads due to the smaller number of processing steps. The computing time in the at least one central control device does increase, but in this case the processing power may be scaled more easily or with a lower expenditure in comparison to the resulting costs. In an overall consideration of the radar system, the radar system according to the present invention may be expanded and scaled cost-effectively and flexibly in relation to previous approaches. Furthermore, due to the higher processing power of the at least one central control device, more complex and higher-performance algorithms may be used for processing the received radar waves.

With increasing high integration, it is additionally possible to integrate a first processing step into a high-frequency component, for example, a so-called monolithic microwave integrated circuit (MMIC). This may preferably be an analysis unit for carrying out a Fourier analysis. For example, the analysis unit may carry out a range FFT of the digitized measuring data. Other Fourier transforms may also be used depending on the modulation method used. This first processing step may generally be integrated cost-effectively into the existing components of a radar sensor head, since the required area in the high-frequency component is very small and a small memory requirement exists. Therefore, the silicon area used may typically remain the same during the manufacturing of the corresponding high-frequency component.

One preferred embodiment of the radar sensor head in accordance with the present invention is distinguished in that a full calibration may be carried out with the aid of the calibration data unit. It is thus advantageously possible to have the calibration carried out completely by the radar sensor head without using a central control unit.

A further preferred embodiment of the radar sensor head according to the present invention is distinguished in that during the calibration procedure, a calibration matrix is applicable on defined channels of the transmitting antenna and/or the receiving antenna. The application of the calibration matrix corresponds to a matrix-vector multiplication, one vector representing a defined number of receiving channels in this case.

A further preferred specific embodiment of the radar sensor head according to the present invention is distinguished in that a frequency correction may be carried out during the calibration procedure. A specific type of the calibration may be carried out in this way, which is reasonable, for example, if filter characteristics have to be corrected.

A further preferred specific embodiment of the radar sensor head according to the present invention is distinguished in that the calibration data are at least one of the following: typical noise level, antenna properties, amplitude/phase deviations, position of the antenna elements, temperature properties, temperature responses. In this way, different properties of the antennas may advantageously be compensated for or adapted during operation of the radar sensor head.

A further preferred specific embodiment of the radar sensor head according to the present invention provides that a Fourier transform may be carried out with the aid of the preprocessing unit. A preprocessing of the received data is carried out, by means of which a data rate to a downstream central control device is advantageously significantly reduced.

A further preferred specific embodiment of the radar sensor head according to the present invention is distinguished in that the radar waves received by the at least one receiving antenna are convertible by an analog-to-digital converter into digital measuring data and are markable using at least one piece of time information. In this way, receiving sequences may be accurately associated with respect to time, which assists accurate processing of the measuring data.

Preferred exemplary embodiments of the present invention are explained in greater detail below with the aid of highly simplified schematic figures.

BRIEF DESCRIPTION OF THE DRAWINGS

In the figures, the same constructive elements each have the same reference numerals.

DETAILED DESCRIPTION OF EXAMPLE EMBODIMENTS

Figure 1:
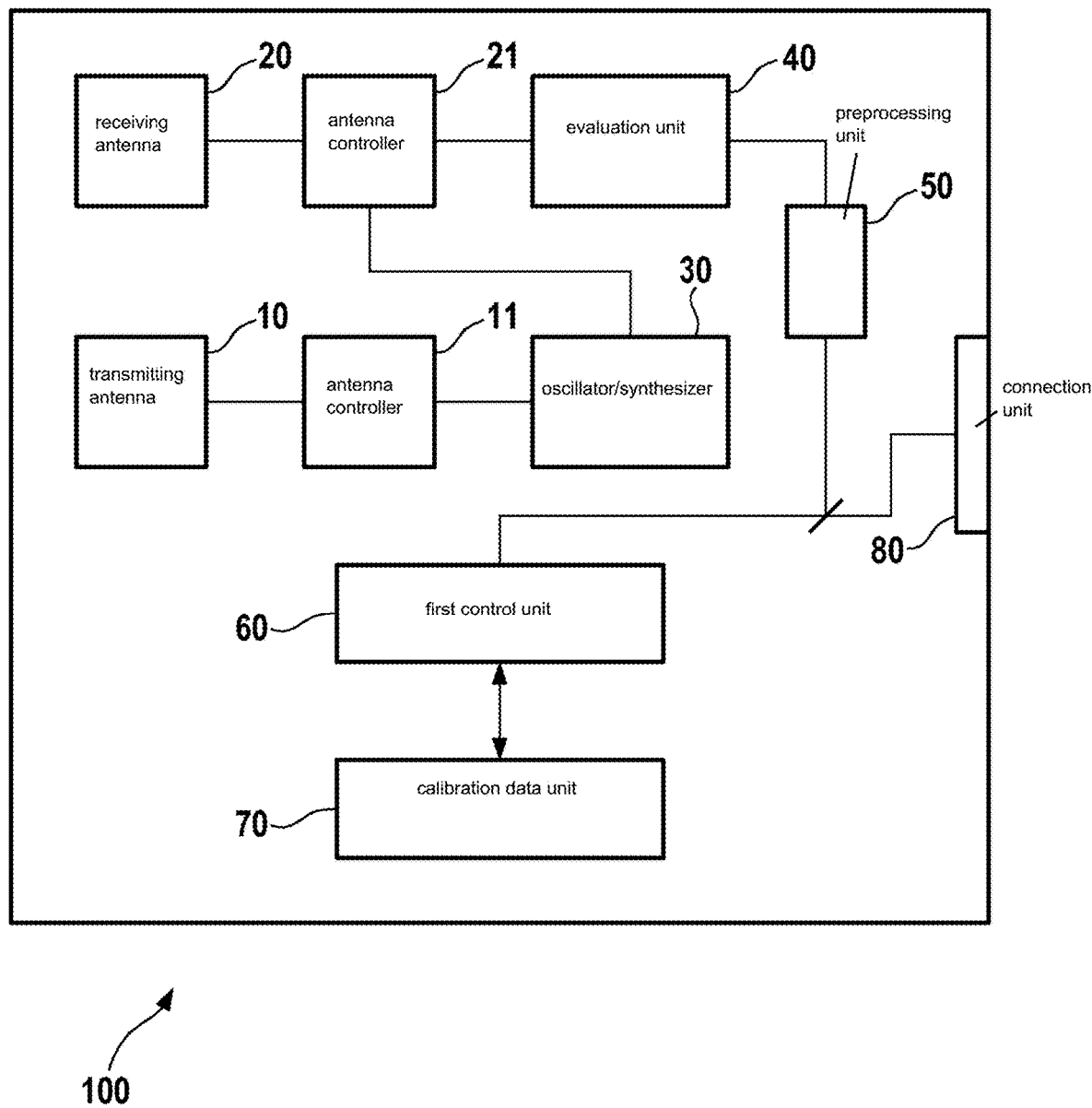
FIG. 1 shows a schematic representation of an example radar sensor head according to the present invention.

FIG. 1 shows a schematic representation of an example radar sensor head 100 according to the present invention.

Radar sensor head 100 includes at least one transmitting antenna 10, which is operable via an associated antenna controller 11. Antenna controller 11 is coupled to, among others, at least one oscillator or synthesizer 30 for generating a carrier frequency of the radar waves.

Furthermore, at least one receiving antenna 20 is connected to an associated antenna controller 21. Antenna controller 21 is functionally connected to an evaluation unit 40, received radar waves being converted into digital measuring data with the aid of an A/D converter situated in evaluation unit 40 and subsequently being transformed in a first processing step with the aid of a preprocessing unit 50.

The radar waves received by receiving antenna 20 of radar sensor head 100 are convertible by the analog-to-digital converter into digital measuring data and are markable using at least one piece of time information. In this way, the received radar waves or measuring data may be converted into a digital format and thus further processed more easily. The measuring data converted into a digital format may advantageously be provided with a timestamp. For example, every recorded spectrum may receive a separate timestamp.

A Fourier transform and/or a calibration may be carried out with the aid of preprocessing unit 50. The scanning values or received radar waves are thus not directly transmitted after the digitizing, but rather are subjected to a first processing process. The Fast Fourier Transform is preferably a range FFT, which may be adapted to the particular intended use, the range FFT representing a first dimension of the FFT, in which the Doppler effect plays a subordinate role and resulting frequency bins are almost exclusively distance-dependent. Since this transformation requires comparatively little memory, analysis unit 50 may be manufactured, for example, in RFCMOS technology and may be integrated into an MMIC, such as a high-frequency component of radar sensor head 100. Since not all range bins, for example, 90% or 45% of the bins, are required due to the antialiasing filter, the resulting quantity of data may be reduced in this case and the FFT may be used simultaneously as a buffer for reducing peak data rates of radar sensor head 100.

Furthermore, a calibration data unit 70, in which calibration data are stored, is in radar sensor head 100. The calibration data may be at least one of the following: typical noise level of the antennas, antenna properties, amplitude/phase deviations of the antennas, position of antenna elements, temperature properties and temperature responses of the antennas.

Antenna properties which are affected by a technological manufacturing process, for example, may be adapted or compensated for by the calibration data. It is thus possible to carry out at least a partial calibration of the transmitting and/or receiving antenna of radar sensor head 100, a full calibration of the mentioned antennas alternatively also being possible. For example, the calibration may be good enough for processing steps up to detection, but not for an angle estimation. The quantity of data is already advantageously reduced by the detection here, however.

The ascertainment of the calibration data is carried out once during the manufacturing, the application of the calibration data taking place during the operative operation of radar sensor head 100. Processing of signals or a suitable activation of the antennas may be carried out with the aid of the calibration data, a full calibration thus no longer having to be carried out by the downstream central control device (not shown).

Deviations of the antenna diagram from an ideal antenna diagram may be described by so-called "global calibration matrices," which describe deviations resulting due to phase and amplitude errors, and also due to feedback between the channels (see also dissertation of M. Schoor, "Hochauflösende Winkelschätzung für automobile Radarsysteme (high-resolution angle estimation for automobile radar systems)," 2010).

These calibration matrices describe the deviations which result due to phase and amplitude errors, and also due to coupling between individual channels of the antenna. This type of calibration may be carried out directly in sensor head 100, thus, insofar as the errors permit, consideration of the hardware properties in central control device 120 is no longer required. Ideally, in this way all relevant hardware properties may be provided by sensor head 100.

As a result, a radar sensor head 100 is thus implemented, the main function of which represents the radar frontend with digitization of the received signal. After the analog-to-digital conversion, the processing may take place with the least possible effort, the data being transmitted at high bandwidth to central control device 120 and processed therein.

This advantageously reduces the costs in radar sensor head 100, since less processing power is required there and also less power loss arises at an unfavorable point (for example, due to the installation location in the vehicle), the processing power advantageously being relocated to central control device 120. The processing power scales significantly better there in comparison to the costs, so that overall an advantageous relocation of processing power into central control device 120 is achieved. This enables computation algorithms to be carried out there which require significantly more processing power than could be available in a single sensor.

Radar sensor head 100 furthermore includes a connection 80 to a broadband data line (not shown), via which the data are transmitted to the central control device (not shown).

Figure 2:
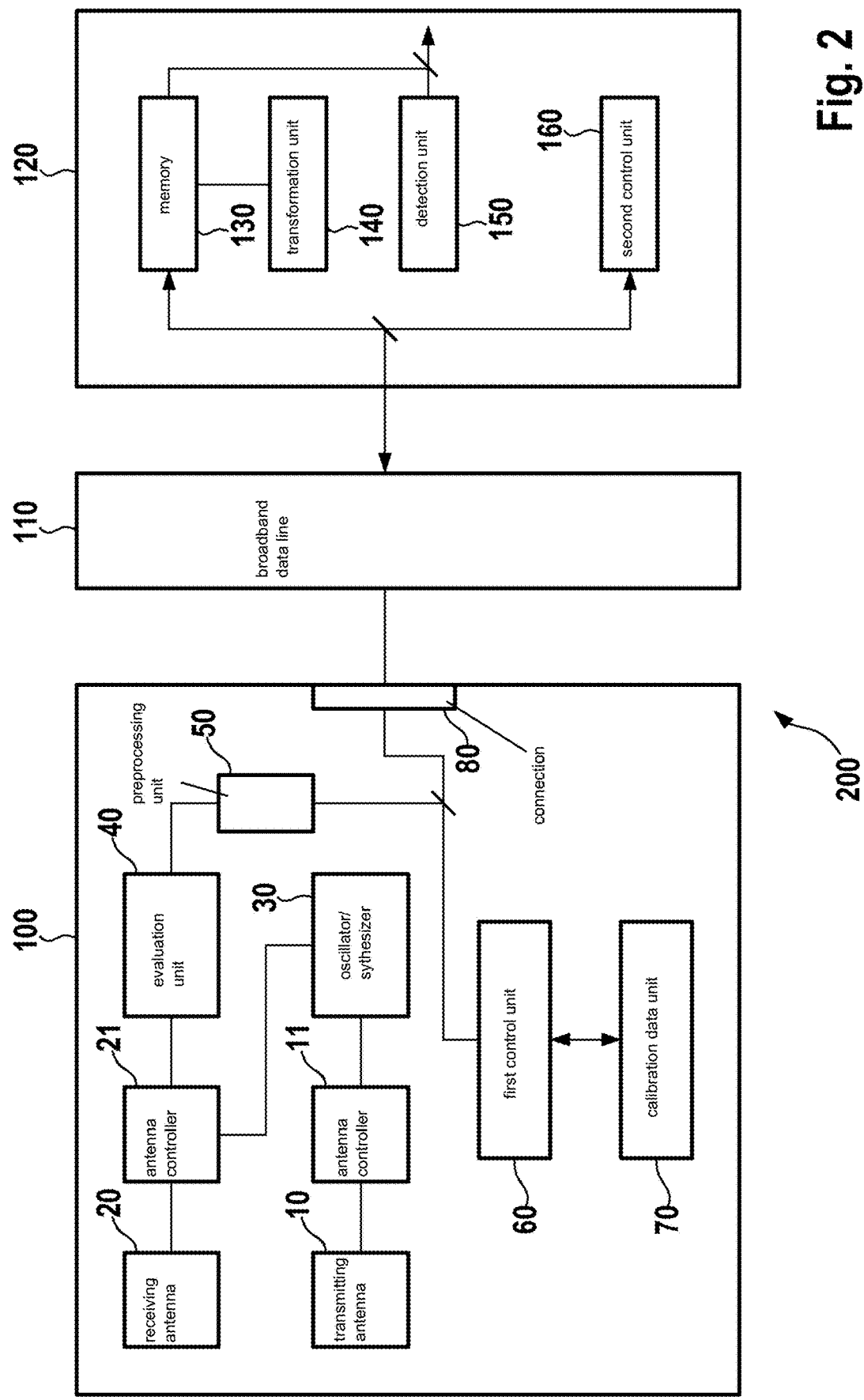
FIG. 2 shows a schematic representation of a radar system having one specific embodiment of a provided radar sensor head in accordance with the present invention.

FIG. 2 shows a basic block diagram of a radar system 200 for a vehicle implemented using provided radar sensor head 100. It is provided that the transformed digital measuring data are transmitted via a broadband data line 110 to a central control device 120. A timestamp is associated with the transmitted digital measuring data with the aid of first control unit 60 situated in radar sensor head 100 and is also transmitted to central control device 120.

If the signal processing takes place in central control device 120, the calibration data thus have to be provided there. The calibration data are used by central control device 120 during the signal processing, for example, by a detection unit 150 situated therein. The calibration of antennas 10, 20 may also take place at least partially in sensor head 100, however.

Central control device 120 may receive and further process the transmitted digital measuring data, for example, with the aid of a memory 130, a transformation unit 140 for carrying out a Doppler FFT, and a second control unit 160, which functionally interacts with first control unit 60 of radar sensor head 100. Due to the timestamp transmitted with the measuring data, they may be precisely classified with respect to time.

Radar system 200 may be designed, for example, as a chirp sequence radar, but may also be operated using other types of modulation. Alternative radar methods may be, for example, slow FMCW radars without a subsequent Doppler FFT, PN radars (pseudo-noise) having an analysis unit as a correlator bank, or an OFDM radar having an analysis unit for carrying out a spectral division.

Due to the provided storage of the calibration data in radar sensor head 100, the computing time in the at least one central control device 120 may be reduced. In addition, a quantity of data to be transmitted via data line 110 may thus also be reduced.

The at least one piece of time information may be generated in radar system 200 by a first control unit 60 situated in radar sensor head 100. First control unit 60 may receive and implement control commands transmitted via data line 110, for example, and provide the digitized measuring data with precise pieces of time information. Furthermore, first control unit 60 may be used for a control of the at least one radar sensor head 100 and, for example, for monitoring control or a cycle control. In order that a chronological synchronization may take place in radar system 200, for example, time stamps for each transmitted chirp or cycle have to be added to the transmitted measuring data by first control unit 60, so that central control device 120 may reasonably use measuring data transmitted from radar sensor head 100.

Transmitting antenna 10 of radar sensor head 100 includes an oscillator 30 for generating a carrier frequency, oscillator 30 being settable by second control unit 160 of central control device 120. Due to the implementation of first control unit 60 in radar sensor head 100, which functionally interacts with second control unit 160, a control of the components of radar sensor head 100 by central control device 120 may advantageously be implemented. The oscillator or oscillators of radar sensor head 100 may thus also be controlled or regulated directly or indirectly.

Oscillators of a radar system 200 having at least two radar sensor heads 100 (not shown) may be synchronized with one another by central control device 120. Multiple radar sensor heads 100 spaced apart from one another may be installed in a vehicle and may be connected via data connections to conduct data to one or multiple central control devices 120. During a usage of multiple radar sensor heads 100, the particular oscillators of transmitting antennas 10 may be synchronized with one another by implemented control units 60 in different radar sensor heads 100. The accuracy of the measurement results may advantageously be increased in this way. The driver assistance functions or the automated driving functions of the vehicle may thus be optimized. In addition, the number of radar sensor heads 100 used may be increased as desired without negative influences on the performance.

Central control device 120 includes at least one processor for processing received data and at least one memory 130 for at least temporarily storing data. In this way, central control device 120 may at least temporarily store the measuring data from radar sensor head 100 transmitted through data line 110 and process, relay, or output the data according to the requirement of the particular application. Central control device 120 may be replaced as needed by a higher performance control unit. Since microprocessor technology is preferably used, more demanding algorithms may be used for processing the measuring data and thus more accurate calculation results may be achieved.

It is also possible that multiple (for example, three) radar sensor heads 100 are connected (not shown) via corresponding data lines 110 to a central control device 120. Central control device 120 outputs control commands in this case via data lines 110 to control units 60 of particular radar sensor heads 100, by which different radar sensor heads 100 and particular oscillators 30 may be optimally adapted and synchronized with one another in particular.

Figure 3:
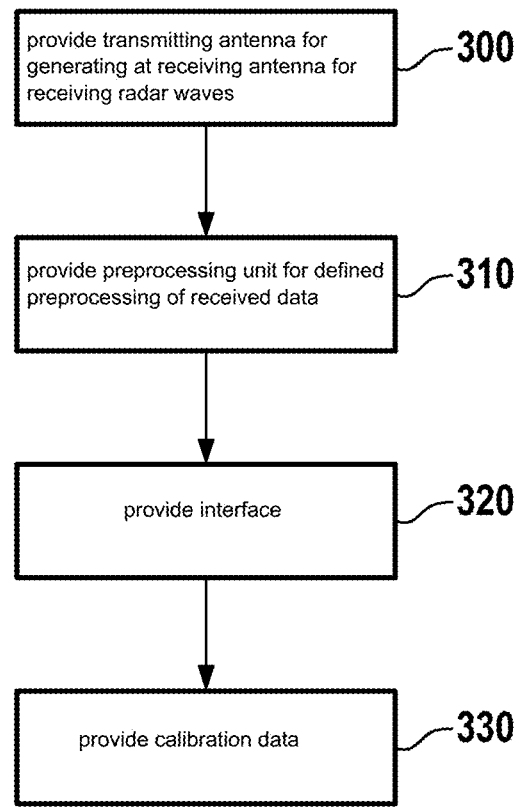
FIG. 3 shows a schematic representation of a method for manufacturing a radar sensor head in accordance with the present invention.

FIG. 3 shows a basic sequence of an example method for manufacturing a radar sensor head according to the present invention.

In a step 300, a provision of at least one transmitting antenna 10 for generating and at least one receiving antenna 20 for receiving radar waves is carried out.

In a step 310, a provision of a preprocessing unit 50 for the defined preprocessing of received data is carried out.

In a step 320, a provision of an interface 80 for connecting radar sensor head 100 to a data line 110 is carried out.

In a step 330, a provision of a calibration data unit 50, 70 for at least partial calibration of transmitting antenna 10 and/or receiving antenna 20 is carried out, calibration data for transmitting antenna 10 and receiving antenna 20 being storable with the aid of calibration data unit 50, 70.

What is claimed is:

1. A radar sensor head for a radar system, comprising:
    at least one transmitting antenna for generating radar waves,
    at least one receiving antenna for receiving radar waves;
    a preprocessing unit for providing defined preprocessing of received data;
    an interface for connecting the radar sensor head to a broadband data line;
    a first control unit; and
    a calibration data unit to at least partially calibrate the transmitting antenna and/or the receiving antenna, wherein calibration data for the transmitting antenna and the receiving antenna is storable using the calibration data unit,
    wherein the antennas are coupled through at least one antenna controller, which is coupled to an oscillator or a synthesizer for generating a carrier frequency of the radar waves,
    wherein the at least one antenna controller is coupled to an evaluation unit, which is coupled to the preprocessing unit,
    wherein the calibration data unit is coupled to the first control unit, which is coupled to the preprocessing unit,
    wherein the radar waves received by the at least one receiving antenna are convertible by an analog-to-digital converter of the evaluation unit into digital measuring data and are markable using at least one piece of time information, and wherein the digital measuring data are provided with a timestamp,
    wherein the preprocessing unit and the calibration data unit are coupled to the interface, and
    wherein the preprocessing unit is configured to perform a range Fast Fourier Transform (FFT), wherein not all range bins are required due to an antialiasing filter, so that a resulting quantity of data is reduced and the FFT is usable simultaneously as a buffer for reducing peak data rates of the radar sensor head.

2. The radar sensor head as recited in claim 1, wherein a full calibration may be is carried out using the calibration data unit.

3. The radar sensor head as recited in claim 1, wherein a calibration matrix is applicable during the calibration to defined channels of the transmitting antenna and/or the receiving antenna.

4. The radar sensor head as recited in claim 1, wherein a frequency correction is carried out during the calibration.

5. The radar sensor head as recited in claim 1, wherein the calibration data include at least one of: a particular noise level, antenna properties, amplitude/phase deviations, positions of the antenna elements, temperature properties, and temperature responses.

6. The radar sensor head as recited in claim 1, wherein the radar waves received by the at least one receiving antenna are convertible by an analog-to-digital converter into digital measuring data and are markable using at least one piece of time information.

7. A radar system, comprising:
    a broadband data line;
    at least one radar sensor head including at least one transmitting antenna for generating radar waves and at least one receiving antenna for receiving radar waves;
    a preprocessing unit for providing defined preprocessing of received data;
    an interface for connecting the radar sensor head to broadband data line; and
    a calibration data unit to at least partially calibrate the transmitting antenna and/or the receiving antenna, wherein calibration data for the transmitting antenna and the receiving antenna are storable using the calibration data unit; and
    at least one central control device to transmit data and to process received data;
    wherein the broadband data line is coupled between the at least one central control device and the interface of the at least one radar sensor head,
    wherein the at least one central control device includes a transformation unit for performing a Doppler FFT, a detection unit, and a second control unit,
    wherein the antennas are coupled through at least one antenna controller, which is coupled to an oscillator or a synthesizer for generating a carrier frequency of the radar waves,
    wherein the at least one antenna controller is coupled to an evaluation unit, which is coupled to the preprocessing unit,
    wherein the calibration data unit is coupled to a first control unit, which is coupled to the preprocessing unit,
    wherein the radar waves received by the at least one receiving antenna are convertible by an analog-to-digital converter of the evaluation unit into digital measuring data and are markable using at least one piece of time information, and wherein the digital measuring data are provided with a timestamp, and
    wherein the preprocessing unit and the calibration data unit are coupled to the interface, and
    wherein the preprocessing unit is configured to perform a range Fast Fourier Transform (FFT), wherein not all range bins are required due to an antialiasing filter, so that a resulting quantity of data is reduced and the FFT is usable simultaneously as a buffer for reducing peak data rates of the radar sensor head.

8. The radar system as recited in claim 7, wherein the at least one central control device includes at least one transformation unit to process received data and at least one memory for at least temporarily storing data.

9. The radar system as recited in claim 7, wherein digital measuring data are transmittable from the radar sensor head via the data line to the at least one central control device, and are synchronized in the at least one central control device by at least one piece of time information.

10. A method for manufacturing a radar sensor head, the method comprising:
    transmitting, via at least one transmitting antenna, radar waves, and receiving, via at least one receiving antenna, radar waves;

providing, via a preprocessing unit, defined preprocessing of received data;

providing, via an interface, connection of the radar sensor head to a broadband data line; and providing, via a calibration data unit, at least partial calibration of the transmitting antenna and/or the receiving antenna, wherein calibration data for the transmitting antenna and the receiving antenna are storable using the calibration data unit;

wherein the antennas are coupled through at least one antenna controller, which is coupled to an oscillator or a synthesizer for generating a carrier frequency of the radar waves, wherein the at least one antenna controller is coupled to an evaluation unit, which is coupled to the preprocessing unit, wherein the calibration data unit is coupled to a first control unit, which is coupled to the preprocessing unit, wherein the radar waves received by the at least one receiving antenna are convertible by an analog-to-digital converter of the evaluation unit into digital measuring data and are markable using at least one piece of time information, and wherein the digital measuring data are provided with a timestamp, wherein the preprocessing unit and the calibration data unit are coupled to the interface, and wherein the preprocessing unit is configured to perform a range Fast Fourier Transform (FFT), wherein not all range bins are required due to an antialiasing filter, so that a resulting quantity of data is reduced and the FFT is usable simultaneously as a buffer for reducing peak data rates of the radar sensor head.

\* \* \* \* \*